US012080174B2

United States Patent
Nielsen et al.

(10) Patent No.: US 12,080,174 B2
(45) Date of Patent: *Sep. 3, 2024

(54) DRONE PAIRING

(71) Applicant: Snap Inc., Santa Monica, CA (US)

(72) Inventors: Simon Saito Haagen Nielsen, Beverly Hills, CA (US); Zachary Collins Conatser, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 247 days.

This patent is subject to a terminal disclaimer.

(21) Appl. No.: 17/748,262

(22) Filed: May 19, 2022

(65) Prior Publication Data

US 2022/0277655 A1    Sep. 1, 2022

Related U.S. Application Data

(63) Continuation of application No. 16/285,389, filed on Feb. 26, 2019, now Pat. No. 11,373,538.

(60) Provisional application No. 62/639,033, filed on Mar. 6, 2018.

(51) Int. Cl.
*G08G 5/00* (2006.01)
*B64C 39/02* (2023.01)
*H04W 4/40* (2018.01)

(52) U.S. Cl.
CPC ......... *G08G 5/0021* (2013.01); *B64C 39/024* (2013.01); *G08G 5/0008* (2013.01); *G08G 5/0013* (2013.01); *H04W 4/40* (2018.02); *B64U 2201/20* (2023.01)

(58) Field of Classification Search
CPC .. G08G 5/0021; G08G 5/0008; G08G 5/0013; G08G 5/0043; G08G 5/0069; B64C 39/024; B64U 2201/20; H04W 4/40; H04W 4/46; H04W 4/023; H04W 4/027; H04W 4/80
See application file for complete search history.

(56) References Cited

U.S. PATENT DOCUMENTS

| 9,438,332 B2 | 9/2016 | Tian et al. |
| 10,505,622 B1* | 12/2019 | Stein ............... G08G 5/0021 |
| 11,373,538 B1 | 6/2022 | Nielsen et al. |
| 2010/0167646 A1 | 7/2010 | Alameh et al. |
| 2012/0215610 A1 | 8/2012 | Amaro et al. |
| 2015/0321759 A1 | 11/2015 | Caubel |
| 2016/0293018 A1* | 10/2016 | Kim ............... G08G 5/0052 |
| 2018/0026708 A1* | 1/2018 | Priest ............... H04W 4/021 370/316 |

(Continued)

*Primary Examiner* — Calvin Cheung
(74) *Attorney, Agent, or Firm* — Culhane PLLC; Stephen J. Weed

(57) ABSTRACT

Systems, devices, and methods for drone pairing are disclosed. Drones may be paired by configuring each of a first drone and a second drone in a drone pairing mode, establishing physical contact between the first drone and the second drone while in the drone pairing mode, determining an acceleration parameter for each of the first drone and the second drone related to the physical contact between the first drone and the second drone, comparing the determined acceleration parameter of the first drone and the determined acceleration parameter of the second drone to identify a match, and pairing the first drone and the second drone in response to the identified match between the compared acceleration parameters of the first and second drones.

20 Claims, 10 Drawing Sheets

(56) References Cited

U.S. PATENT DOCUMENTS

2019/0043000 A1* 2/2019 Wang .................. B60L 53/30

* cited by examiner

DRONE PAIRING

CROSS-REFERENCE TO RELATED APPLICATIONS

This application is a Continuation of U.S. application Ser. No. 16/285,389 filed on Feb. 26, 2019, now U.S. Pat. No. 11,373,538, and claims priority to U.S. Provisional Application Ser. No. 62/639,033 filed on Mar. 6, 2018, the contents of which are incorporated fully herein by reference.

TECHNICAL FIELD

The present subject matter relates to drone communication and, more specifically, to systems and methods of pairing drones in order to facilitate communication with one other.

BACKGROUND

Unmanned aerial vehicles (UAV), commonly known as drones, are aircraft without a human pilot aboard. Conventionally, upon powering on a drone, the drone seeks to establish communication with a controller (e.g., of a user device or another drone). Upon establishing communication, the drone waits to receive pairing data from the controller. The pairing data may be a password sent in a secured link to the drone.

Pairing of multiple drones enables communication between the drones and is useful for coordination of flight patterns desired by drone operators. When there are multiple drones in close proximity, however, it may be difficult to pair the drones as desired by the drone operators.

BRIEF DESCRIPTION OF THE DRAWINGS

The drawing figures depict non-limit examples. In the figures, like reference numerals refer to the same or similar elements.

DETAILED DESCRIPTION

In the following description, numerous specific details are set forth by way of examples in order to provide a thorough understanding of the relevant teachings. How to practice the present teachings, however, should be apparent to those skilled in the art without the need for such details. In other instances, well-known methods, procedures, components, and circuitry are described at a relatively high-level, without detail, in order to avoid unnecessarily obscuring aspects of the present teachings.

In an example, a system includes at least two drones, each of which includes an accelerometer, a processor, and a memory including programming accessible to the processor. Execution of the programing by the processor of a respective one of the at least two drones configures the respective drone to perform functions, including functions to enter a drone pairing mode. Execution of the programming additionally configures the respective drone to determine a first acceleration parameter related to physical contact between the respective drone and another of the at least two drones and to receive a second acceleration parameter from the other of the at least two drones. Execution of the programming further configures the drone to compare the first acceleration parameter of the drone and the second acceleration parameter of the other of the at least two drones to identify a match and pair the drone and the other of the at least two drones in response to the identified match between the compared acceleration parameters of the drone and the other of the at least two drones.

Figure 1:
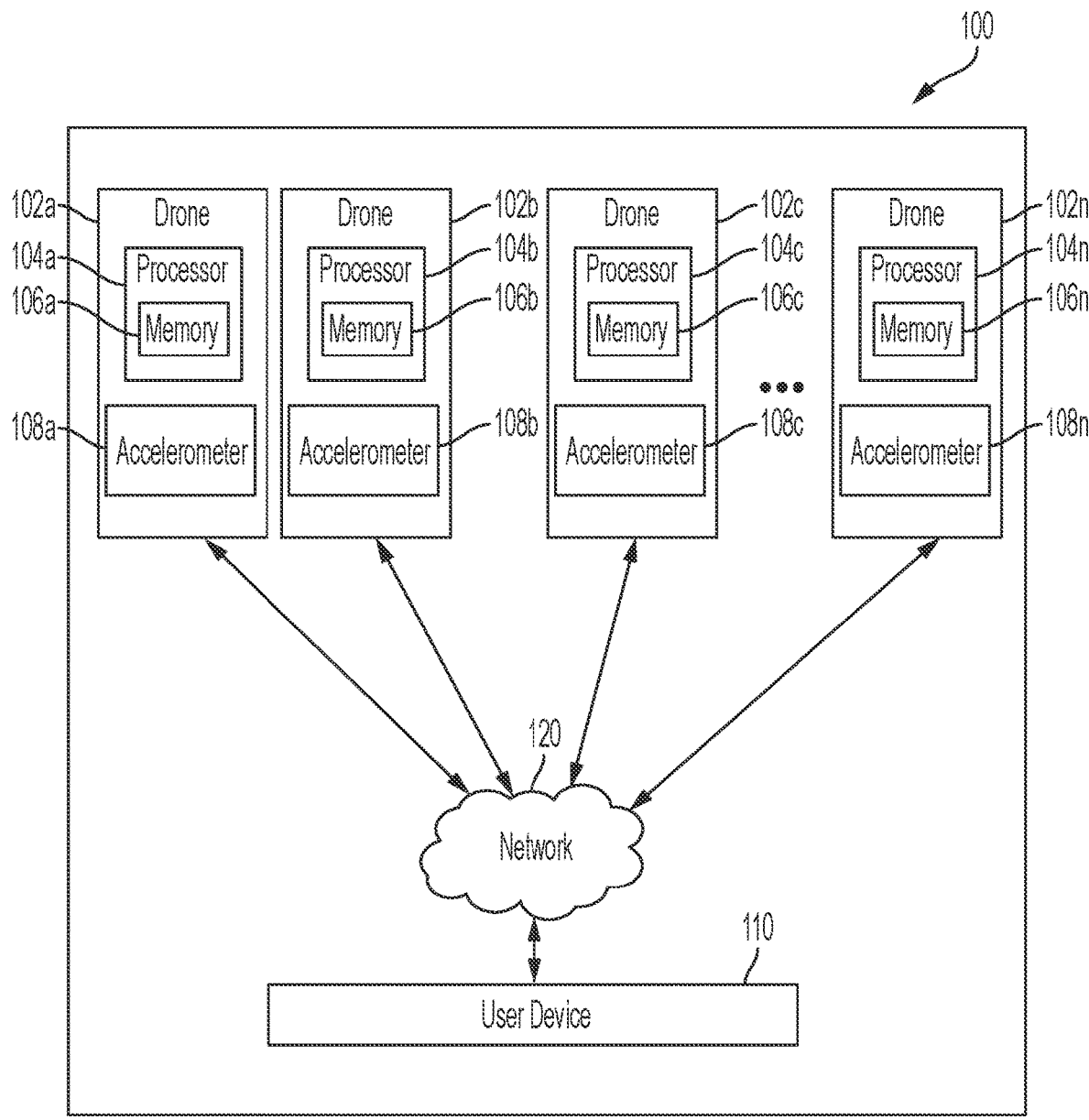
FIG. 1 is a block diagram of an example system for drone pairing including multiple drones.

FIG. 1 is block diagram of an example system 100 including a plurality of drones 102a-102n. Each of the drones 102a-102n includes a respective processor 104a-104n, which includes a respective memory 106a-106n. In the example illustrated in FIG. 1, each of the drones 102a-102n support their respective processors 104a-104n including their respective memories 106a-106n. Alternatively, each of the processors 104a-104n and/or their respective memories 106a-106n may be separate components in the system 100. One of skill in the art will understand suitable drones, processors, and memory from the description herein.

Each of the illustrated drones 102a-102n include a corresponding accelerometer 108a-108n, which measures acceleration parameter of the corresponding drone. Some examples of the acceleration parameter include, but are not limited to, one or more of acceleration, direction of movement, position and/or orientation. In one example, each of the memories 106a-106n may store instructions for execution by the corresponding processors 104a-104n to utilize their respective drones' 102a-102n to perform various functions described herein.

Figure 2:
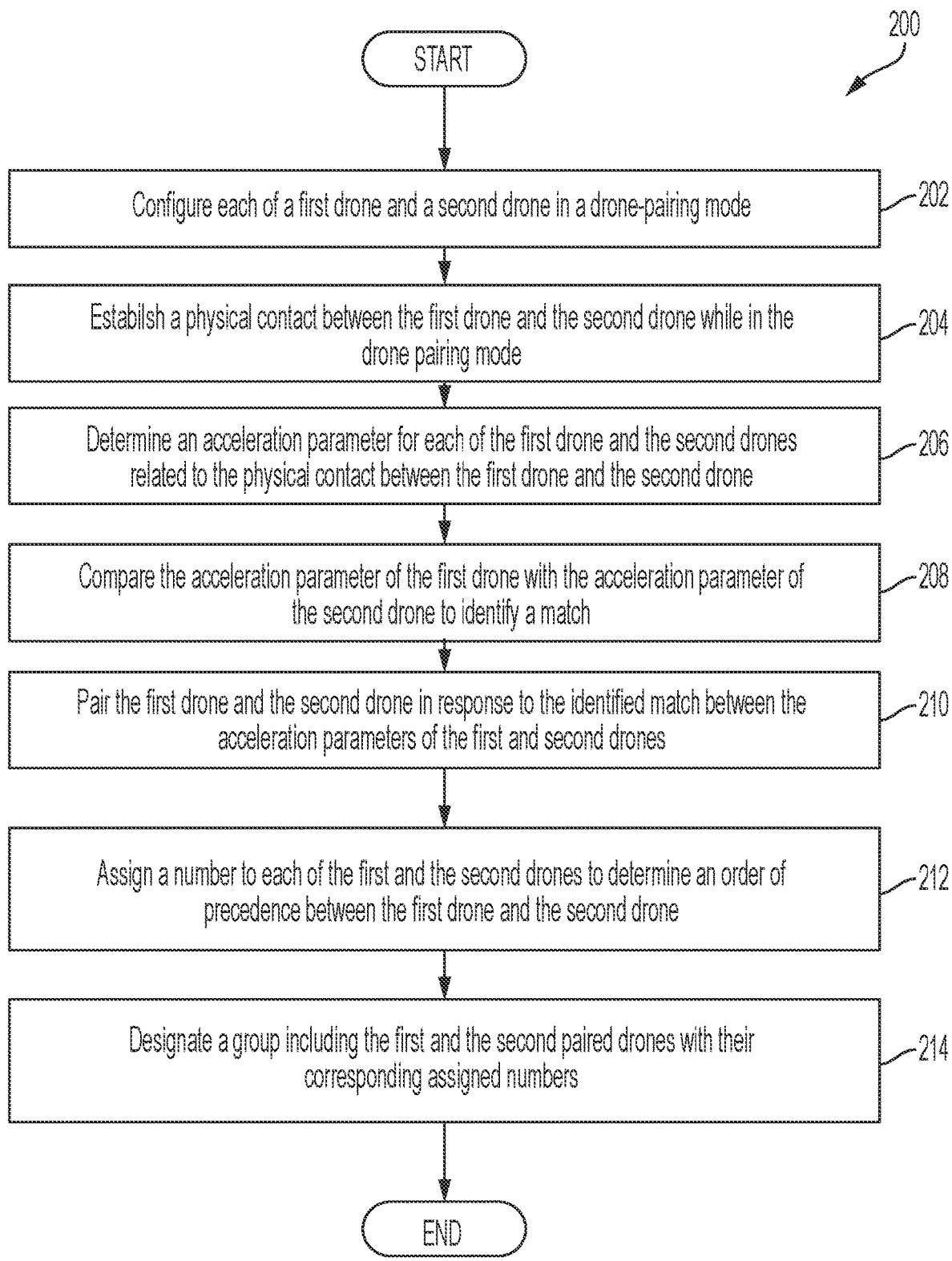
FIG. 2 is a flowchart illustrating an example method for pairing two drones.

FIG. 2 is flow chart 200 illustrating an example method for pairing two drones. In one example, the system 100 of FIG. 1 implements the steps of the flow chart 200. One of skill in the art will understand other suitable components for implementing the method of flow chart 200 from the description herein.

Figure 3A:
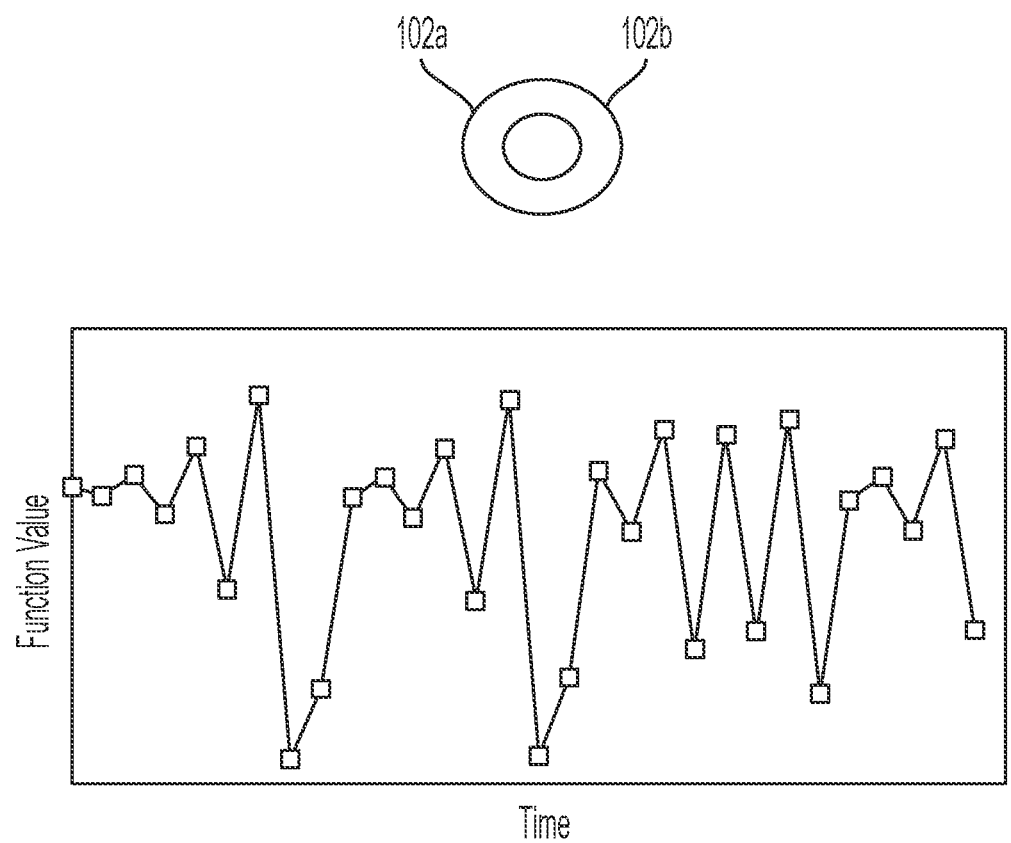
FIG. 3A is a drone pairing example utilizing two of the drones of FIG. 1.

At block 202, configure each of a first drone and a second drone in a drone-pairing mode. In one example, a first drone 102a and a second drone 102b enter into a drone pairing mode when they are powered on, as shown in FIG. 3A. Entering the drone pairing mode may additionally be conditioned upon the drones detecting they are within a pre-defined pairing distance of one another (e.g., within a few meters). The pre-defined pairing distance may be a pre-defined value stored in a memory 106a and 106b of the corresponding first and second drones 102a and 102b. In other examples, the drones may enter a drone pairing mode in response to being shaken or colliding with another drone or object (e.g., as determined by processor 104 based on input from accelerometer 108), in response to the processor detecting a press of a button (not shown), and/or in response to a signal from the user device 110. Other techniques for entering a drone pairing mode will be understood by one of skill in the art from the description herein.

At block 204, establish physical contact between the first drone and the second drone while in the drone pairing mode. The physical contact may be a momentary contact (e.g., a tap or a bump or a prolonged contact (e.g., for a few seconds or longer as the drones are moved in tandem in a pre-defined, random, or pseudo random pattern). The drones may include a platform and/or connector (not shown) for facilitating desired physical contact between the drones. Additionally, the drones may include a switch such as a proximity switch for establishing when the drones are in physical contact with one another.

At block 206, determine an acceleration parameter for each of the first drone and the second drone related to the physical contact between the first drone and the second drone. In an example, a first accelerometer 108a determines a first acceleration parameter of the first drone 102a. Some examples of the first acceleration parameter include a rate of change of velocity over time, position and orientation of the first drone 102a. Similarly, a second accelerometer 108a determines a second acceleration parameter of the second drone 102b. Each drone 102 may store an output signal from its respective accelerometer 108 in the memory 106 as the respective acceleration parameter. Additionally, each drone 102 may periodically transmit its stored output signal (via a transceiver; not shown) for reception by other drones (via their transceivers; not shown) in the system 100.

At block 208, compare the acceleration parameter of the first drone with the acceleration parameter of the second drone to identify a match. In one example, the first processor 104a of the first drone 102a receives the second acceleration parameter of the second drone 102b and compares the first acceleration parameter of the first drone 102a with the received second acceleration parameter of the second drone 102b. The drones may identify a match if at least a portion of acceleration parameters (e.g., approximately a second or more) are substantially identical (indicative of movement during prolonged contact) or are substantially identical in magnitude, but opposite in direction (indicative of a bump or tap). The longer the portion of acceleration parameters required for a match, the higher the likelihood of an accurate match.

Figure 3B:
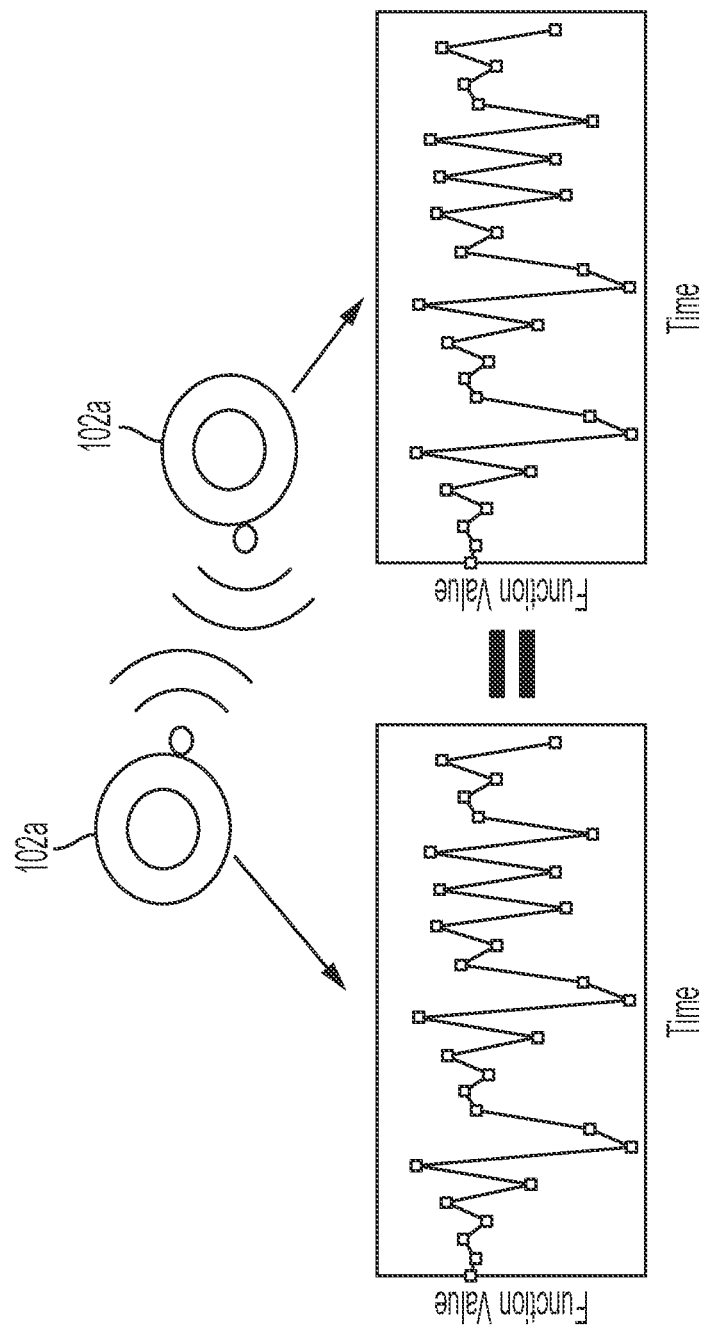
FIG. 3B is an example of a verification process for the two paired drones of FIG. 3A.

In accordance with the prolonged contact example, the first processor 104a identifies the match when the first acceleration parameter of the first drone 102a includes a portion that is equal in magnitude and direction to a portion of the second acceleration parameter of the second drone 102b as illustrated in FIG. 3B. Likewise, the second drone 104b identifies the match when the second acceleration parameter of the second drone 102b includes a portion that is equal in magnitude and direction to a portion of the first acceleration parameter of the first drone 102a.

Figure 3C:
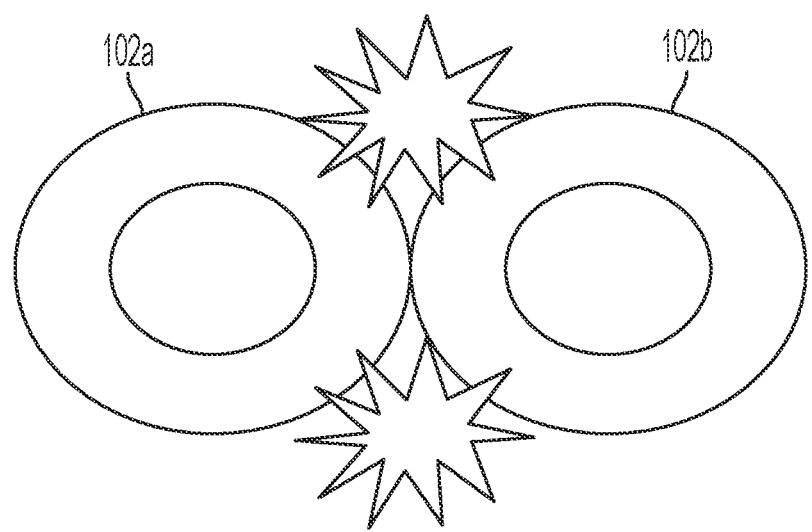
FIG. 3C is another drone pairing example utilizing two of the drones of FIG. 1.

In accordance with the momentary contact example, the first processor 104a identifies the match when a portion the first acceleration parameter of the first drone 102a has the same magnitude but is in an opposite direction to the second acceleration parameter of the second drone 102b as illustrated in FIG. 3C. Likewise, the second drone 102b identifies the match when a portion the second acceleration parameter of the second drone 102b has the same magnitude but is in an opposite direction to the first acceleration parameter of the first drone 102a.

At block 210, pair the first drone and the second drone in response to the identified match between the acceleration parameters of the first and the second drones. In one example, the first drone 102a pairs with the second drone 102b such that the first drone and the second drones 102a and 102b are aware of each other's presence and are in communication with each other. For example, each of the first and the second paired drones 102a and 102b may communicate their pairing data with each other. The pairing data may include, but is not limited to, identification information unique to the drone, e.g., a serial number or other designated unique identifier. In one example, the first drone 102a stores the pairing data of the second drone 102b in its memory 106a and the second drone 102b stores the pairing data of the first drone 102a in its memory 102b. The first and the second drones 102a and 102b may utilize the pairing data to identify communications originating from each other.

At block 212, assign a precedence number to each of the first and the second drones to determine an order of precedence between the first drone and the second drone. In one example, the first and the second drones 102a and 102b respectively self-assign a number to determine an order of precedence. In another example, each of the first and the second drones 102a and 102b respectively randomly assigns precedence numbers to each other. In one example, a pre-assigned parameter is stored in the first and/or second memories 106a or 106b respectively. In one example, the one of the first or the second processors 104 or 104b utilizes the pre-assigned parameter to determine an order of precedence and accordingly assigns the number to each of the first or the second drones 102a and 102b respectively. The parameter may include but is not limited to a serial number assigned to the first and the second drones and/or timing clocks of the first and the second drones. In one example, the numbers assigned to the first and the second drones 102a and 102b respectively are stored in their respective memories 106a and 106b.

Figure 3D:
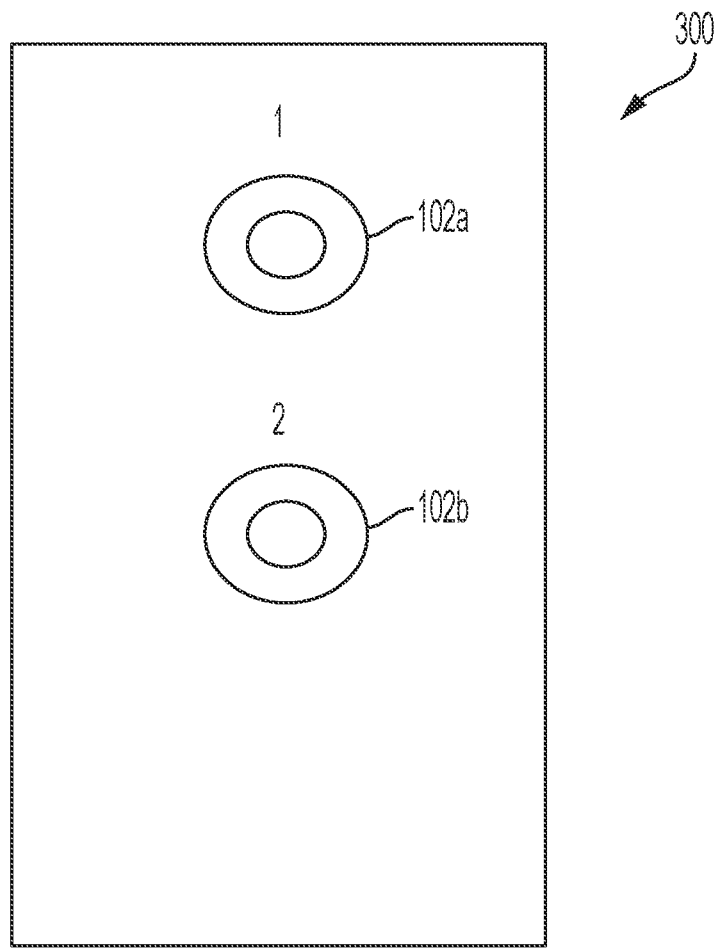
FIG. 3D is an example of grouping the two paired drones of FIG. 3B.

At block 214, designate a group including the two or more paired drones with their corresponding assigned numbers. FIG. 3D illustrates a group 300 including the first and the second drones 102a and 102b respectively with their corresponding assigned numbers 1 and 2. In one example, the user device 110 designates the first and the second paired drones 102a and 102b respectively in the group to complete a task specific to the group. For example, the task of a first group (e.g., of heavier drones) may include projecting stable background images onto a surface of an object, while the task of a second group (e.g., of more nimble drones) may be projecting a foreground image(s). In one example, the system generates multiple groups including two or more drones.

Figure 3E:
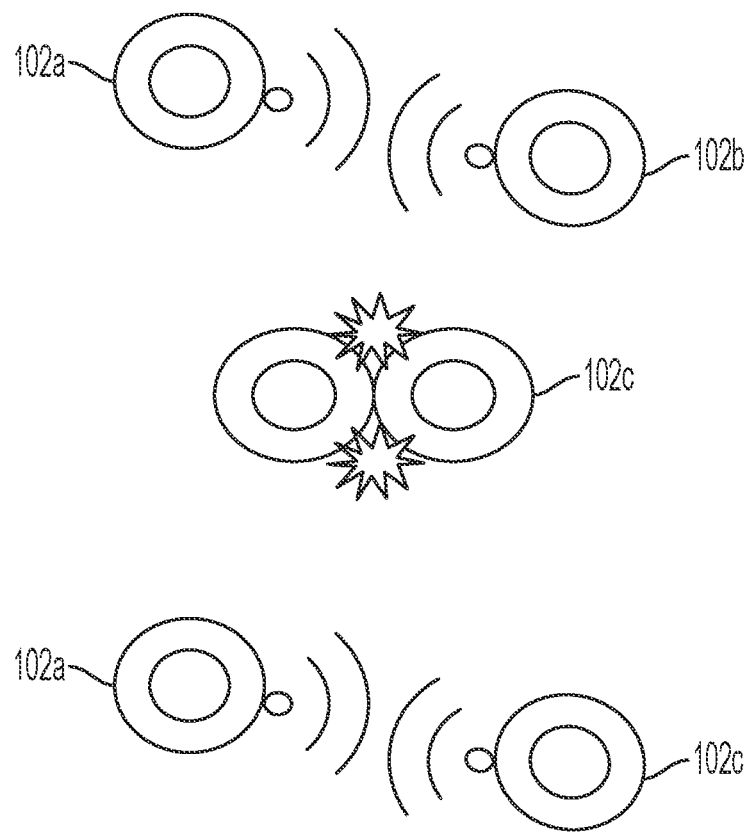
FIG. 3E is a drone pairing example illustrating the addition of a drone of FIG. 1 to a pre-existing group of two or more drones.
Figure 3F:
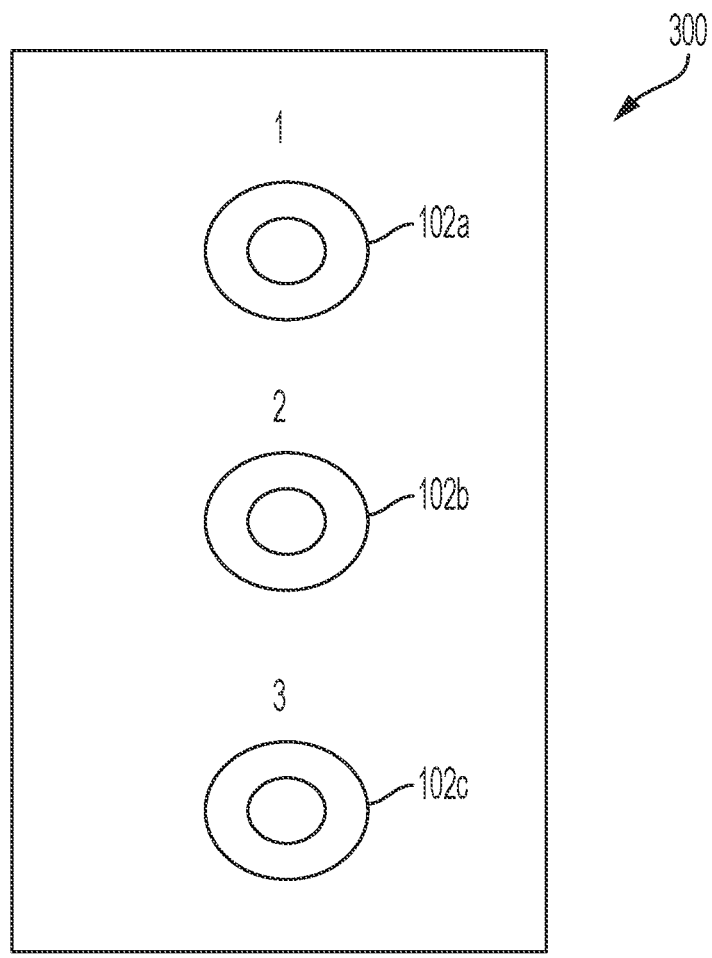
FIG. 3F is an example of a group including the three paired drones of FIG. 3E.

In one example, upon designating the group including the first and the second paired drones, the system determines an additional drone to pair with the first and second paired drones. For example, a third drone 102c to pair with the first drone and second drone 102a and 102b in the group 1. In one example, the system performs the steps in the blocks 202-210 of the flow chart 200 for the third drone to pair with either the first drone or the second drone that is part of pre-existing group 300. FIG. 3E illustrates the pairing of third drone 102c with either the first drone 102a or the second drone to add the third drone to the group 300. In one example, the system assigns the third drone with a number followed by the number assigned to the second drone in the group in the order of precedence. For example, the third drone 102c is assigned the number 3 in the group 300 as illustrated in FIG. 3F.

Referring back to FIG. 1, in one example, the system 100 also includes a user device 110, which communicates with each of the drones' 102a-102n with a network 120 such as an intranet and/or the Internet. The network 120 may include a wireless communication network such as a radio frequency communication, light communication, satellite communications etc. In one example, the user device 110 is a mobile user device such as a smartphone, smart eyewear, a laptop, a personal computer (PC), a desktop, or other smart device capable of triggering the first and the second drones to enter a pairing mode and assigning an order of precedence to each of the first and the second drones (e.g., alone or with assistance of a remote computing device).

Figure 4:
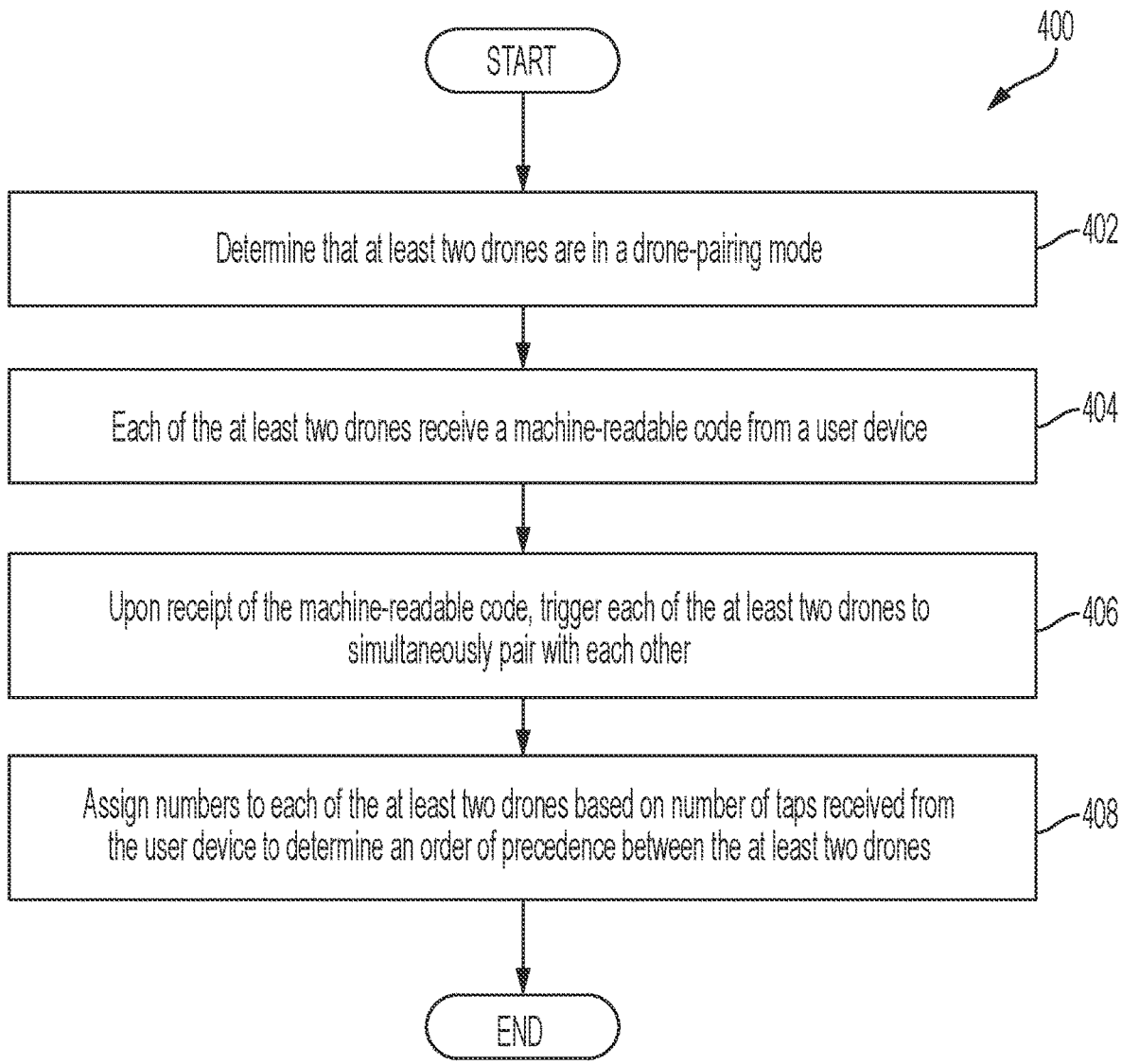
FIG. 4 is a flowchart illustrating an example method for drone pairing utilizing two drones and a user device.

FIG. 4 is flow chart 400 illustrating an example method for pairing two drones utilizing a user device. In one example, the system 100 of FIG. 1 implements the steps of the flow chart 400 utilizing the user device 110 of FIG. 1. One of skill in the art will understand other suitable components for implementing the method of flow chart 400 from the description herein.

At block 402, determine that at least two drones are in a drone-pairing mode. In one example, a first drone 102a and a second drone 102b enter into a drone pairing mode when they are powered on. Entering the drone pairing mode may additionally be conditioned upon the drones detecting they are within a pre-defined pairing distance of one another (e.g., within a few meters). The first and second drones 102a and 102b may communicate that they are in a drone pairing mode to the user device 110. In other examples, the drones may enter a drone pairing mode and communicate that they are in a drone pairing mode to user device 110 in response to being shaken or colliding with another drone or object (e.g., as determined by processor 104 based on input from accelerometer 108), in response to the processor detecting a press of a button (not shown), and/or in response to a signal from the user device 110. Other techniques for entering a drone pairing mode will be understood by one of skill in the art from the description herein.

At block 404, each of at least two drones receive a machine-readable code from a user device. In one example, each of the first and second drones 102a and 102b respectively receives a machine-readable code from an application (not shown) of the user device 110 via the network 120. The machine-readable code may be a visual identifier such as a quick response (QR) code received by the processor 104 of a drone (e.g., via an imager of the drone; not shown). The processor 104a of the first drone 102a may receive the machine-readable code and the processor 104b of the second drone 102b may receive the same machine-readable code.

At block 406, upon receipt of the machine-readable code, trigger each of the at least two drones to pair with each other. In one example, each of the first and the second drones 102a and 102b respectively pair with one another based on the information received from the machine-readable code. For example, the processor 104a of the first drone 102a and the processor 104b of the second drone 102b may communicate the received machine-readable code with each other, which triggers each of the first and the second drone 102a and 102b to pair with each other.

At block 408, assign numbers to each of the at least two drones based on number of taps received from the user device to determine an order of precedence between the at least two drones. In one example, the user device 110 is used to assign precedence based on taps to each drone. For example, a user may tap the user device 110 one time on the first drone 102a to assign a first priority and two times on the second drone 102b to assign a second priority. The processor 104 may identify the number of taps based on input from its respective accelerometer 108 and may interpret the priority based on the number of taps and interpretation instructions stored in memory.

Aspects of the methods for drone pairing, as outlined above, may be embodied in programming in general purpose computer hardware platforms 500 and 600 (such as described above with respect to FIGS. 5 and 6), e.g., in the form of software, firmware, or microcode executable by a networked computer system such as a server or gateway, and/or a programmable nodal device.

In one example, program aspects of the technology are "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may communicate through the Internet or various other telecommunication networks. Such communications, for example, may enable loading of the software, from one computer or processor (e.g., CPU 502 and CPU 602 of FIGS. 5 and 6 respectively) into another, for example, from a processor 104a-104n of the system 100 to a computer or software of another system (not shown). Thus, another type of media that may bear the software elements includes optical, electrical and electromagnetic waves, such as used across physical communication interface(s) 504 and 604 of FIGS. 5 and 6 respectively, between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Figure 5:
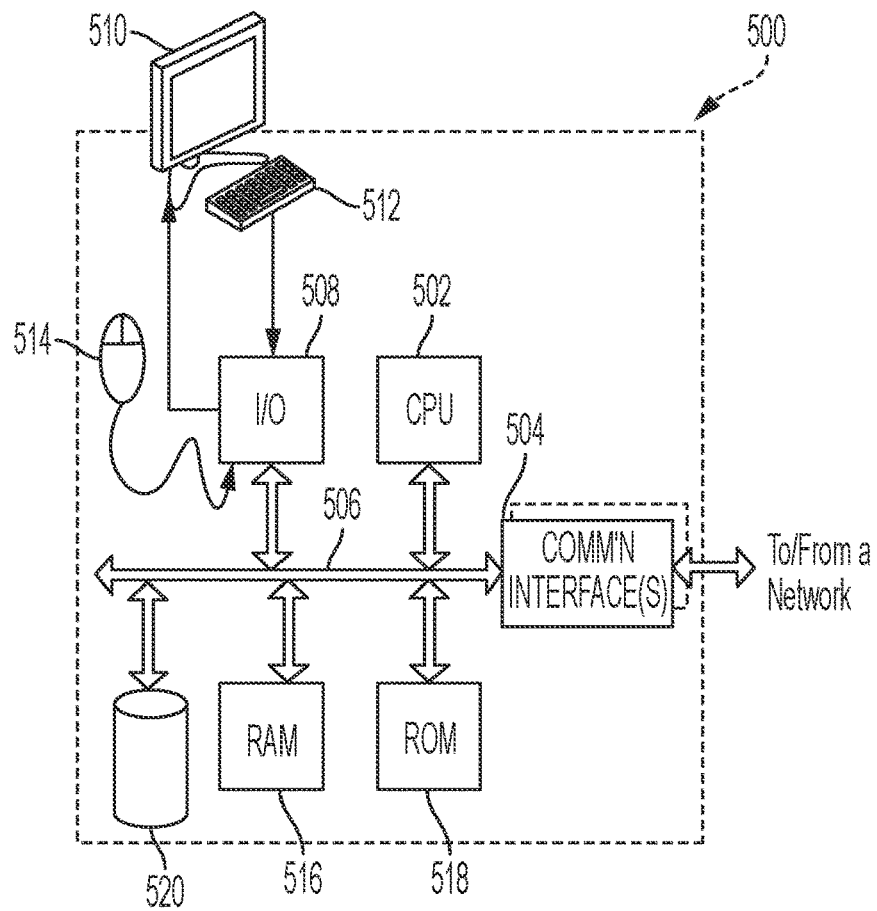
FIG. 5 is a functional block diagram illustrating a general-purpose computer hardware platform configured to implement the functional examples described with respect to FIGS. 1-4.
Figure 6:
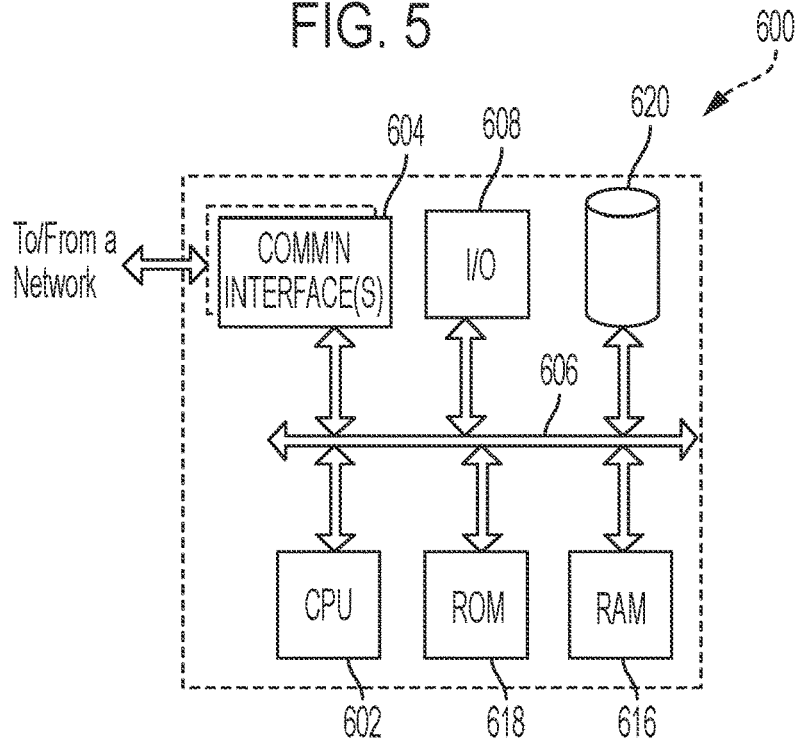
FIG. 6 is another functional block diagram illustrating a general-purpose computer hardware platform configured to implement the functional examples described with respect to FIGS. 1-4.

Hence, a machine-readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a machine or computer platform. Tangible transmission media include coaxial cables; copper wire and fiber optics, including the wires that include a bus (e.g., 506 and 606 of FIGS. 5 and 6 respectively) within a computer system that communicates to other components of the computer system via an input/output (I/O) 508 and 608 of FIGS. 5 and 6 respectively. Carrier-wave transmission media can take the form of electric or electromagnetic signals, or acoustic or light waves such as those generated during radio frequency (RF) and light-based data communications. In one example, as shown in FIG. 5, the computer system includes a video display unit 510, (e.g., a liquid crystal display (LCD) or a cathode ray tube (CRT)), an alphanumeric input device 512 (e.g., a keyboard), a cursor control device 514 (e.g., a mouse), each of which communicate via the I/O 508.

Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM (e.g. 516 and 616 of FIGS. 5 and 6 respectively), a ROM (e.g. 518 and 618 of FIGS. 5 and 6 respectively), hard disk drive (e.g. 520 and 620 of FIGS. 5 and 6 respectively) a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may include a software or firmware implementation encoded in any desired language. Programming instructions, when embodied in machine-readable medium accessible to a processor of a computer system or device, render computer system or device into a customized special-purpose machine to perform the operations specified in the program performed by processor 104*a*-104*n* of the system 100.

While the foregoing has described are considered the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They intend to have a reasonable range that is consistent with the functions to which they relate and with what is ordinary in the art to which they pertain.

The scope of protection limits solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 105 of the Patent Act, nor should they be interpreted in such a way. Any unintended embracement of such subject matter is hereby disclaimed.

Except as stated immediately above, nothing that has been stated or illustrated is intended or interpreted to cause a dedication of any component, step, feature, object, benefit, advantage, or equivalent to the public, regardless of whether it is or is not recited in the claims.

It understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

In addition, in the foregoing Detailed Description, it is seen that various features are grouped together in various examples to streamline the disclosure. This method of disclosure does not reflect an intention that the claimed examples require more features than are expressly recited in each claim. Rather, as the following claims reflect, the subject matter of the claims lies in less than all features of any single disclosed example. Thus, the following claims are hereby incorporated into the Detailed Description, with each claim standing on its own as a separately claimed subject matter.

While the foregoing describes what is considered to be the best mode and other examples, it is understood that various modifications may be made and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system comprising:
   a user device;
   at least two drones, each of the at least two drones having a processor and a memory and communicatively coupled with the user device; and
   programming in the memory of each of the at least two drones, wherein execution of the programming by the processor of a respective one of the at least two drones configures the respective drone to perform functions, including functions to:
   enter a drone pairing mode;
   receive a machine-readable code from the user device;
   trigger pairing with the other of the at least two drones upon receipt of the machine-readable code; and
   assign numbers to each of the at least two drones to determine an order of precedence between the drone and the at least one other drone.

2. The system of claim 1, wherein each of the at least two drones enter the drone pairing mode when powered on.

3. The system of claim 1, wherein the functions further include functions to:
   determine a distance between the drone and the other of the at least two drones; and enter the drone pairing mode when the determined distance between the drone and the other of the at least two drones is within a predefined pairing distance.

4. The system of claim 1, wherein the functions further include a function to communicate to the user device that the at least two drones are in the drone pairing mode.

5. The system of claim 4, wherein at least one of the at least two drones communicates to the user device that the at least two drones are in the drone pairing mode in response to being shaken or colliding with another drone or object, in response to the processor of the at least one of the at least two drones detecting a press of a button, or in response to a signal from the user device.

6. The system of claim 1, wherein the machine-readable code comprises a quick response (QR) code.

7. The system of claim 1, wherein triggering pairing with the other of the at least two drones upon receipt of the machine-readable code comprises a processor of a first drone and a processor of a second drone communicating the received machine-readable code with each other.

8. The system of claim 1, wherein assigning numbers to each of the at least two drones to determine an order of precedence between the drone and the at least one other drone comprises a user tapping the user device one time on a first drone to assign a first priority and two times on a second drone to assign a second priority.

9. The system of claim 1, wherein each of the at least two drones comprises an accelerometer and assigning numbers to each of the at least two drones to determine an order of precedence between the drone and the at least one other drone comprises each drone of the at least two drones identifying a number of taps between each of the at least two drones based on input from the accelerometer of said each drone of the at least two drones, and each drone of the at least two drones interpreting the order of precedence between the drone and the at least one other drone based on the number of taps and interpretation instructions stored in the memory of said each drone of the at least two drones.

10. The system of claim 1, wherein the functions further include functions to:
communicate with the other of the at least two drones; and
assign numbers to each of the at least two drones based on the communication to determine the order of precedence between the drone and the at least one other drone.

11. A method for pairing drones, the method comprising the steps of:
configuring each of a first drone and a second drone in a drone pairing mode;
receiving a machine-readable code from a user device;
triggering pairing between the first drone and the second drone upon receipt of the machine-readable code; and
assigning numbers to each of the first drone and the second drone to determine an order of precedence between the first drone and the second drone.

12. The method of claim 11, wherein configuring each of the first drone and the second drone in the drone pairing mode comprises powering on the first drone and the second drone.

13. The method of claim 11, wherein configuring each of the first drone and the second drone in the drone pairing mode comprises:
determining a distance between the first drone and the second drone; and
entering the drone pairing mode when the determined distance between the first drone and the second drone is within a predefined pairing distance.

14. The method of claim 11, further comprising at least one of the first drone and the second drone communicating to the user device that the first drone and the second drone are in the drone pairing mode.

15. The method of claim 14, further comprising the at least one of the first drone and the second drone communicating to the user device that the first drone and the second drone are in the drone pairing mode in response to being shaken or colliding with another drone or object, in response to detecting a press of a button, or in response to a signal from the user device.

16. The method of claim 11, wherein triggering pairing between the first drone and the second drone upon receipt of the machine-readable code comprises a processor of the first drone and a processor of the second drone communicating the received machine-readable code with each other.

17. The method of claim 11, wherein assigning numbers to each of the first drone and the second drone to determine an order of precedence between the first drone and the second drone comprises a user tapping the user device one time on the first drone to assign a first priority and two times on the second drone to assign a second priority.

18. The method of claim 11, wherein assigning numbers to each of the first drone and the second drone to determine an order of precedence between the first drone and the second drone comprises the first drone and the second drone identifying a number of taps between the first drone and the second drone based on input from an accelerometer of each of the first drone and the second drone, and the first drone and the second drone interpreting the order of precedence between the first drone and the second drone based on the number of taps and interpretation instructions stored in a memory of the first drone and the second drone.

19. The method of claim 11, further comprising:
the first drone communicating with the second drone; and
assigning numbers to the first drone and the second drone based on the communication to determine the order of precedence between the first drone and the second drone.

20. A non-transitory computer readable medium having stored thereon a program, wherein execution of the program of the non-transitory computer readable medium configures a drone to:
configure the drone in a drone pairing mode;
receive a machine-readable code from a user device;
trigger pairing between the drone and another drone upon receipt of the machine-readable code; and
assign numbers to each of the drone and the another drone to determine an order of precedence between the drone and the another drone.

* * * * *